(12) United States Patent
Porter et al.

(10) Patent No.: US 8,629,574 B2
(45) Date of Patent: Jan. 14, 2014

(54) BALLAST FOR FLUORESCENT EMERGENCY LIGHTING

(75) Inventors: Kevin Porter, Peachtree City, GA (US); Anthony Mangiaracina, Mobile, AL (US)

(73) Assignee: Cooper Technologies Company, Houston, TX (US)

( * ) Notice: Subject to any disclaimer, the term of this patent is extended or adjusted under 35 U.S.C. 154(b) by 487 days.

(21) Appl. No.: 12/859,012

(22) Filed: Aug. 18, 2010

(65) Prior Publication Data

US 2011/0043040 A1  Feb. 24, 2011

Related U.S. Application Data (60) Provisional application No. 61/234,987, filed on Aug. 18, 2009.

(51) Int. Cl.
*H01J 23/34* (2006.01)

(52) U.S. Cl.
USPC .............................. 307/66; 315/86

(58) Field of Classification Search
USPC .............................. 307/66; 315/86
See application file for complete search history.

(56) References Cited

U.S. PATENT DOCUMENTS

| 5,469,028 | A | * | 11/1995 | Nilssen | 315/291 |
| 5,666,029 | A | * | 9/1997 | McDonald | 315/86 |
| 5,811,938 | A | * | 9/1998 | Rodriguez | 315/86 |
| 5,814,971 | A | * | 9/1998 | Johnson | 320/127 |
| 6,107,744 | A | * | 8/2000 | Bavaro et al. | 315/86 |
| 6,753,651 | B1 | * | 6/2004 | Goral | 315/86 |
| 6,987,363 | B1 | | 1/2006 | Goral | |
| 7,641,358 | B1 | * | 1/2010 | Smith et al. | 362/183 |
| 2002/0003525 | A1 | | 1/2002 | Hwang | |
| 2003/0141819 | A1 | * | 7/2003 | Cojocary | 315/86 |
| 2005/0184705 | A1 | | 8/2005 | Gawell et al. | |
| 2007/0182342 | A1 | | 8/2007 | Hagen et al. | |
| 2008/0211455 | A1 | | 9/2008 | Park et al. | |
| 2009/0322228 | A1 | * | 12/2009 | Bakre et al. | 315/86 |

FOREIGN PATENT DOCUMENTS

| JP | 2007172921 | 7/2007 |
| KR | 10-2003-0063782 | 7/2003 |
| KR | 10-2004-0094923 | 11/2004 |
| KR | 10-2006-0096758 | 9/2006 |

OTHER PUBLICATIONS

International Search Report and Written Opinion for PCT/US2010/045947 issued Feb. 28, 2011.
International Search Report and Written Opinion for PCT/US2010/045945 issued Feb. 25, 2011.

* cited by examiner

*Primary Examiner* — Daniel Cavallari
(74) *Attorney, Agent, or Firm* — King & Spalding LLP (57) ABSTRACT

An emergency ballast for a fluorescent lamp includes a rechargeable battery. The emergency ballast also includes a circuit for receiving an electrical voltage and providing a recommended charging voltage to the battery. The electrical voltage is one of two amplitudes, and the circuit provides a charge to the battery without regard to the amplitude of the electrical voltage. The first amplitude of the electrical voltage can be 120 volts, and the second amplitude can be 277 volts. The emergency ballast includes a capacitor electrically coupled to the circuit that provides an additional voltage to the rechargeable battery when the electrical current is 120 volts. The emergency ballast also includes a switch for electrically decoupling the capacitor from the circuit when the electrical current is 277 volts.

20 Claims, 9 Drawing Sheets

BALLAST FOR FLUORESCENT EMERGENCY LIGHTING

CROSS REFERENCE TO RELATED APPLICATIONS

This non-provisional patent application claims priority to U.S. Provisional Patent Application No. 61/234,987, filed on Aug. 18, 2009, the entire contents of which are hereby fully incorporated herein by reference. This application is also related to U.S. patent application Ser. No. 12/859,023, titled "Sinusoidal Alternating Current Ballast For Fluorescent Emergency Lighting," filed on Aug. 18, 2010, the entire contents of which are hereby fully incorporated herein by reference.

TECHNICAL FIELD

The disclosure relates generally to apparatus and methods for providing emergency power to linear fluorescent lamps. More specifically, the disclosure relates to apparatus and methods for providing current to fluorescent lamps using an emergency battery such that the life of the lamp is not shortened unnecessarily.

BACKGROUND

Most modern buildings have the capability to provide emergency lighting in the event of an interruption to the main power supply. Emergency lighting not only improves safety, but is required by most building codes. Conventional emergency lighting systems work by identifying a failure in the main power supply (or mains power) and switching in a battery backup to supply power to some of the lamps in the building until such time as main power can be restored.

Although simple in concept, there are many issues that emergency lighting systems must resolve. One such issue relates to the fact that most buildings that have emergency lighting use linear fluorescent lamps to provide illumination. Fluorescent lamps are designed to run on alternating current. The batteries that provide emergency power provide direct current. Accordingly, the circuitry, or "ballast," that provides current from the battery to the fluorescent lamp must convert the battery's direct current into alternating current capable of illuminating the fluorescent lamp.

Many buildings have two different power supplies. For example, in the United States, many commercial buildings have one power supply that operates at 120 volts, and another that operates at 277 volts. Frequently, both supplies will be present in a single junction box. Alternatively, only one supply or the other will be present in a given junction box. During a typical installation process, it may not be possible or convenient to ascertain which voltage is carried on any given wire. For this reason, lighting manufacturers have created universal voltage fixtures for main lighting applications. These universal voltage fixtures are capable of running from either available power supply.

Conventional universal-voltage-fixture circuitry involves the use of an integrated circuit to switch between 120 volts and 277 volts. Because of the expense associated with this solution, however, the feature is not cost effective for emergency ballasts, and therefore is not used. Instead, emergency ballasts require the installer to know the line voltage that will be provided to the emergency ballast. Because this information may not be available, the result of this drawback of conventional emergency ballasts can be additional time in installation or troubleshooting, or even a failure of an emergency ballast that has inadvertently been incorrectly installed.

Conventional emergency ballasts also have a problem when switching between standard operational mode, which is controlled through the standard fluorescent ballast, and emergency mode, which is controlled by the emergency ballast. Certain conventional fluorescent ballasts include a feature for determining whether a lamp is at the end of its usable life. These conventional ballasts do so by detecting whether the attached lamp is in an "open cathode" condition. Once an open cathode is detected, the conventional fluorescent ballast will shut the fixture down. When a power failure occurs, the emergency ballast will identify the power outage and switch to emergency mode.

Once power is resumed, however, conventional emergency ballasts switch control back over to the fluorescent ballast. If this transition occurs quickly, the fluorescent ballast may not have had time to power up properly, causing the fluorescent ballast to identify an open cathode condition and shut down. Then, because neither the emergency ballast nor the fluorescent ballast are operating, the light fixture will be off, potentially necessitating a call to maintenance to remedy the problem.

Conventional emergency ballasts also suffer from an inability to use certain types of rechargeable batteries. Conventional emergency ballasts must be made as inexpensively as possible, or risk being unmarketable. The need to remain inexpensive limits the types of rechargeable batteries that are available for use in emergency ballasts. Specifically, batteries using certain rechargeable technologies, such as nickel cadmium (NiCd), can be charged simply by applying a charge to the battery. Other rechargeable batteries, however, require a more sophisticated charging process.

By way of example only, nickel metal hydride (NiMH) cannot receive a constant voltage. If a charging voltage is applied to NiMH batteries for an extended period after they are charged, the batteries can fail. Conventional charging circuits for NiMH batteries involve the use of an integrated circuit that can handle the sensitive charging needs of a NiMH batteries. The integrated circuit, however, is expensive, and therefore renders it inappropriate for use in emergency ballasts. This is a problem in conventional emergency ballasts, as NiMH technology allows for the use of much smaller batteries that can provide the same amount of power as compared to NiCd batteries.

SUMMARY

The present invention provides an emergency ballast for a fluorescent lamp. In one exemplary embodiment, the emergency ballast can include a rechargeable battery and a circuit for receiving an electrical voltage and providing charge to the battery. The electrical voltage can have one of at least two amplitudes, and the circuit can provide charge to the battery regardless of the amplitude of the electrical voltage. The charge provided to the battery can be the recommended charging voltage for the battery.

The first amplitude of the electrical voltage can be 100, 120, or 347 volts. The second amplitude of the electrical voltage can be 277, 347, or 220 volts. The circuit can include a capacitor electrically coupled to the circuit that provides additional voltage to the battery when the electrical voltage is at one amplitude and a switch for electrically decoupling the capacitor from the battery when the electrical voltage is at another amplitude.

In one exemplary embodiment, the emergency ballast can also include a charging circuit for applying a trickle charge to the battery. The charging circuit can apply the recommended charging current to the battery for a first period of time, and can apply a trickle charge to the battery after the first period of time. In one exemplary embodiment, the first period of time is twenty-four to forty-eight hours.

The charging circuit can also include a thermal protection circuit that includes a switch that can electrically decouple the charging circuit from the battery when the battery exceeds a predetermined temperature. The switch can be a transistor. The thermal protection circuit can also include a thermistor thermally coupled to the battery and a resistor electrically coupled to the thermistor so as to create a voltage divider. The voltage divider can be electrically coupled to the transistor such that when the voltage across the resistor exceeds a predetermined level, current is delivered to the transistor that causes the transistor to electrically decouple the battery from the charging circuit.

In one exemplary embodiment, the emergency ballast can also include a standard mode wherein a fluorescent lamp is powered using mains power and an emergency mode wherein the fluorescent lamp is powered using the battery. The emergency ballast can switch from emergency mode to standard mode in response to the resumption of mains power, and can include a transition circuit for delaying the transition between standard mode and emergency mode. The transition circuit can include a relay configured to switch the emergency ballast from emergency mode to standard mode. A transistor that prevents the relay from switching when the transistor is not conductive can be electrically coupled to the relay. A capacitor can be electrically coupled to mains power and the transistor, such that after the capacitor has charged from mains power, the capacitor delivers current to the transistor such that the transistor becomes conductive and causes the relay to switch the emergency ballast into standard mode.

In another exemplary embodiment, an emergency fluorescent ballast includes a battery and a charging circuit for charging the battery. The charging circuit can include an input that receives a charging current from the ballast and a timing circuit that can deliver the charging current to the battery for a predetermined time and a trickle charging current after the predetermined time. The predetermined time can be twenty-four to forty-eight hours. The charging current can be a recommended charging current for the battery, and the trickle charging current can be a current calculated to keep the battery at a substantially full charge. The battery can be a nickel metal hydride battery.

The charging circuit can also include a thermal protection circuit that prevents application of the charge to the battery when the battery exceeds a predetermined temperature. The thermal protection circuit can include a thermistor thermally coupled to the battery and a resistor electrically coupled to the thermistor such that the resistor and the thermistor create a voltage divider. When the voltage across the resistor exceeds a predetermined level, current can be delivered to a transistor that is electrically coupled to the battery such that when the transistor is not conductive, the charging circuit does not deliver charge to the battery. When current is delivered to the transistor, the transistor becomes conductive and decouples the battery from the charging circuit.

The emergency ballast can also include a circuit configured to receive an electrical voltage and provide the charging current to the battery. The electrical voltage can have one of at least two amplitudes, and the circuit can provide the charging current to the battery without regard to which of the two amplitudes is associated with the electrical voltage. The amplitudes can be 120 and 277 volts.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF EXEMPLARY EMBODIMENTS

The present invention is directed to electrical lighting devices. In particular, certain exemplary embodiments of the invention are directed to an emergency fluorescent ballast that is installed in a fixture without regard to the amplitude of the voltage that is provided to the ballast. Certain other exemplary embodiments of the invention are directed to an emergency fluorescent ballast that uses more advanced battery technology, such as nickel metal hydride, as an emergency power supply. Yet other exemplary embodiments of the invention are directed to an emergency fluorescent ballast that prevents a standard ballast from improperly detecting an end-of-life open cathode condition in the lamp during the switchover from emergency operation to standard operation due to relay bounce.

Figure 1:
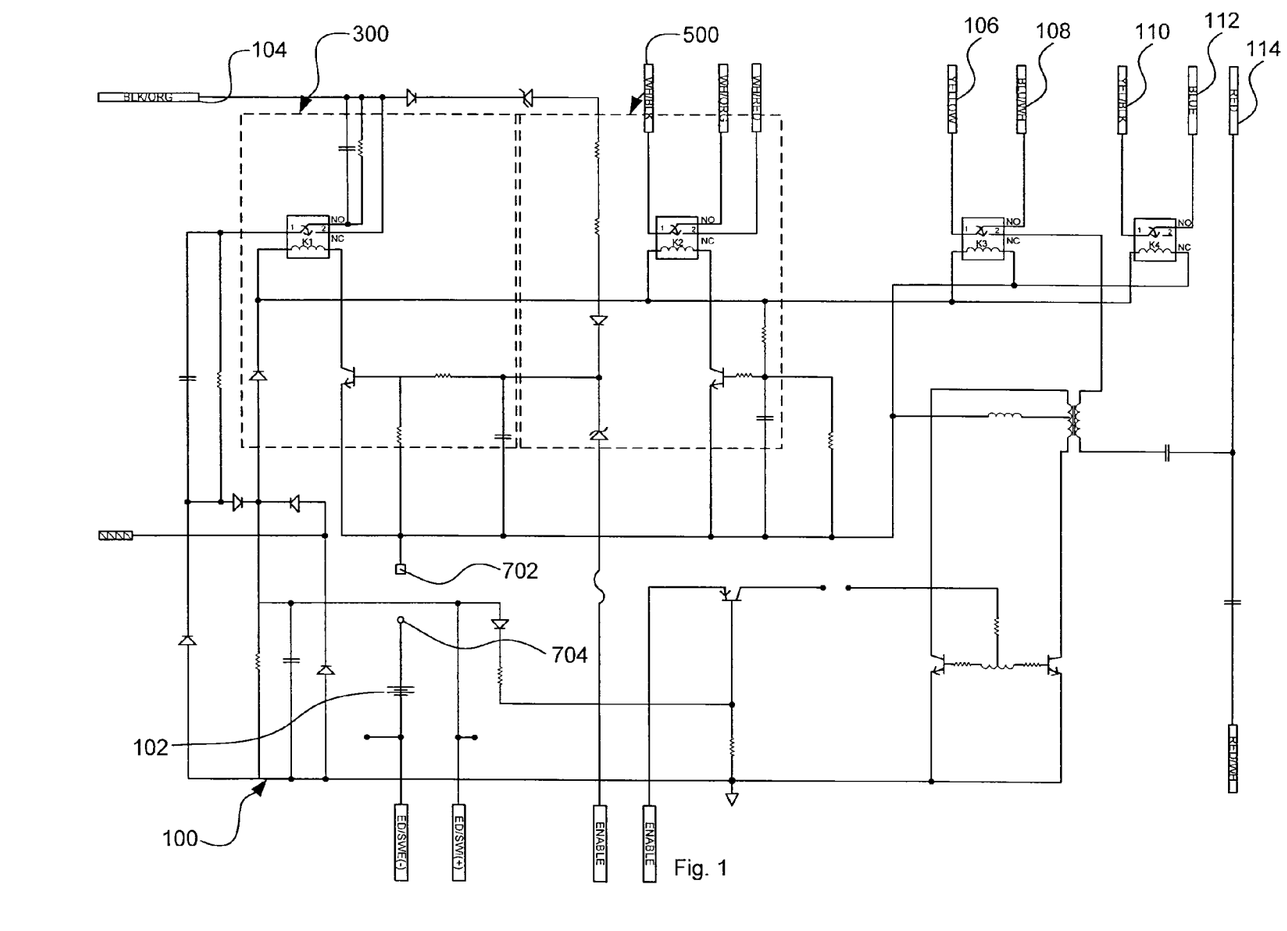
FIG. 1 is a circuit diagram setting forth an exemplary circuit for providing emergency power without regard to the amplitude of the input current according to one exemplary embodiment.

The invention may be better understood by reading the following description of non-limiting, exemplary embodiments with reference to the attached drawings, wherein like or corresponding, but not necessarily identical, parts of each of the figures are identified by the same reference characters, and which are briefly described as follows. FIG. 1 is a circuit diagram setting forth an exemplary emergency ballast 100 for providing emergency power to a lamp. The ballast 100 includes a battery 102 that provides direct current in the event that mains power to the lamp is interrupted. In an exemplary embodiment, the battery 102 is a nickel-metal-hydride rechargeable battery. Alternatively, the battery 102 can be nickel-cadmium, lithium-ion, or any rechargeable battery technology. In yet another alternative embodiment, the battery 102 is not rechargeable. The emergency ballast 100 also includes several inputs and outputs 104, 106, 108, 110, 112, 114. The emergency ballast 100 has an input 104 electrically coupled to the main AC power supply from the building (the "hot" wire or "mains power"). The emergency ballast 100 also has inputs 106 and 110 that are electrically coupled to the anode side of the lamp to be powered (not shown). The emergency ballast also has inputs 108 and 112 that are electrically coupled to the AC fluorescent ballast (not shown). The emergency ballast 100 also has an output 114 that is electrically coupled to the cathode side of the lamp to be powered.

The emergency ballast 100 also includes a circuit 300 that provides emergency power without regard to the input current. The emergency ballast 100 also includes a circuit 500 that prevents a standard alternating-current ballast (a ballast that employs mains power rather than a battery) from improperly determining that a lamp is at the end of its useful life during a switchover from emergency power to mains power due to relay bounce. In certain embodiments, the emergency ballast 100 also includes a circuit 700 for charging a battery. In the event that the circuit 700 is electrically coupled to the ballast 100, connection point 702 is electrically coupled to the input of the circuit 700 and connection point 704 is electrically coupled to the output of the circuit 700. Circuits 300, 500, and 700 will be discussed in greater detail with respect to FIGS. 2-9, below.

Figure 2:
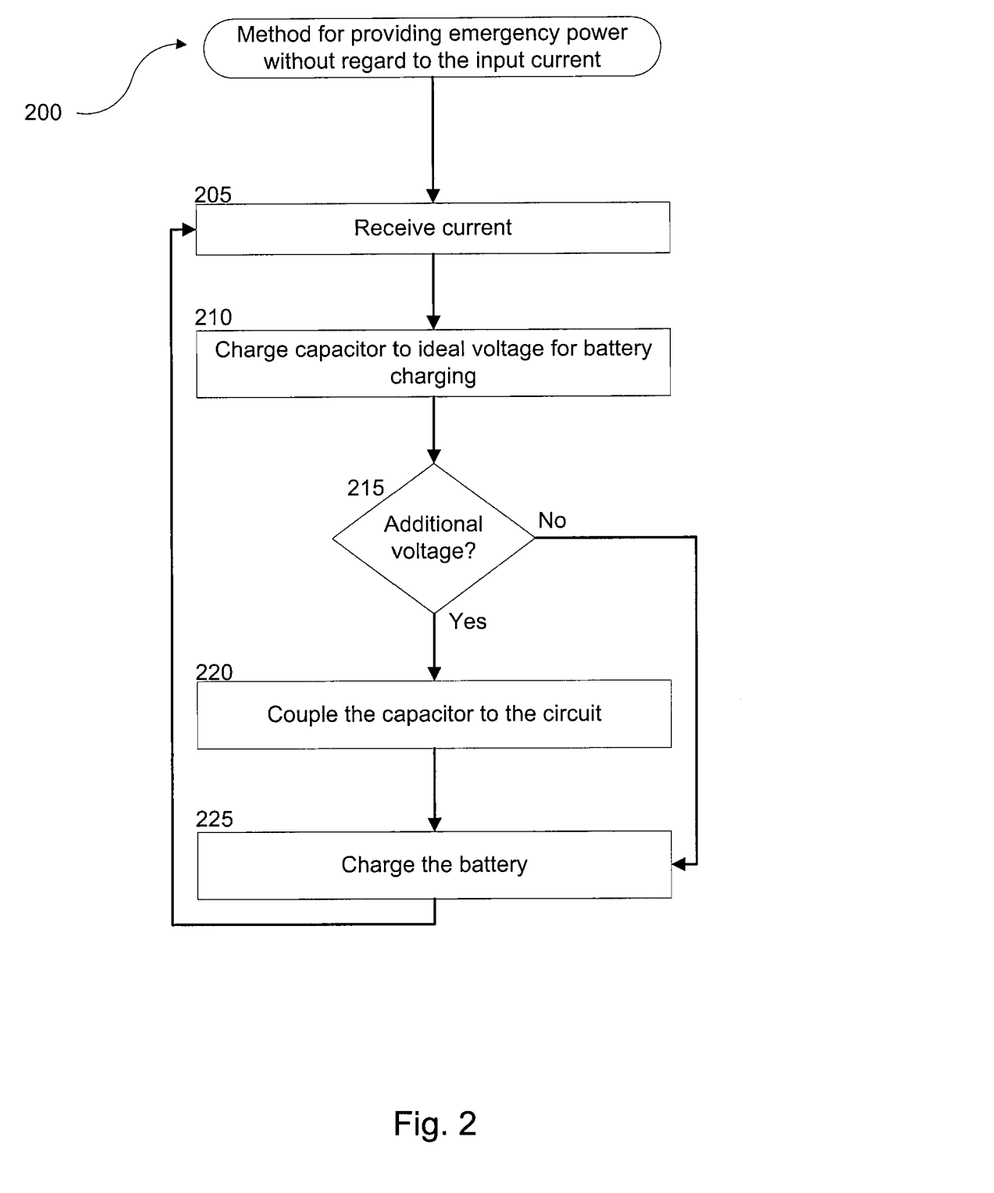
FIG. 2 is a flow chart illustrating a method for providing emergency power without regard to the amplitude of the input current according to one exemplary embodiment.

Turning now to FIG. 2, one exemplary method 200 for providing emergency power without regard to the input current is provided. FIG. 2 will be discussed with reference to FIGS. 1 and 3. In step 205, current is received into the emergency ballast 100. The method 200 then proceeds to step 210 wherein a capacitor 304 is charged to the ideal voltage for charging the battery 102 in the emergency ballast 100. In step 215, a determination is made if the voltage is greater than the ideal voltage for charging the battery, which indicates that the emergency ballast 100 is coupled to a larger input supply. By way of example, it is determined that the voltage is greater than the ideal voltage if the voltage is sufficiently high to surpass the breakdown voltage of a Zener diode 308 when the breakdown voltage is set to the ideal voltage for charging the battery. By way of example, in the United States, the larger input supply is 277 volts. If the determination in decision step 215 is affirmative, the YES branch is followed to step 220, where a capacitor 304 is electrically coupled to the circuit 300, thereby reducing the voltage in the circuit 300 to the ideal voltage for charging the battery 102. The method then proceeds to step 225, wherein the battery 102 is charged. The method then loops back to step 205 and the process continues.

Figure 3:
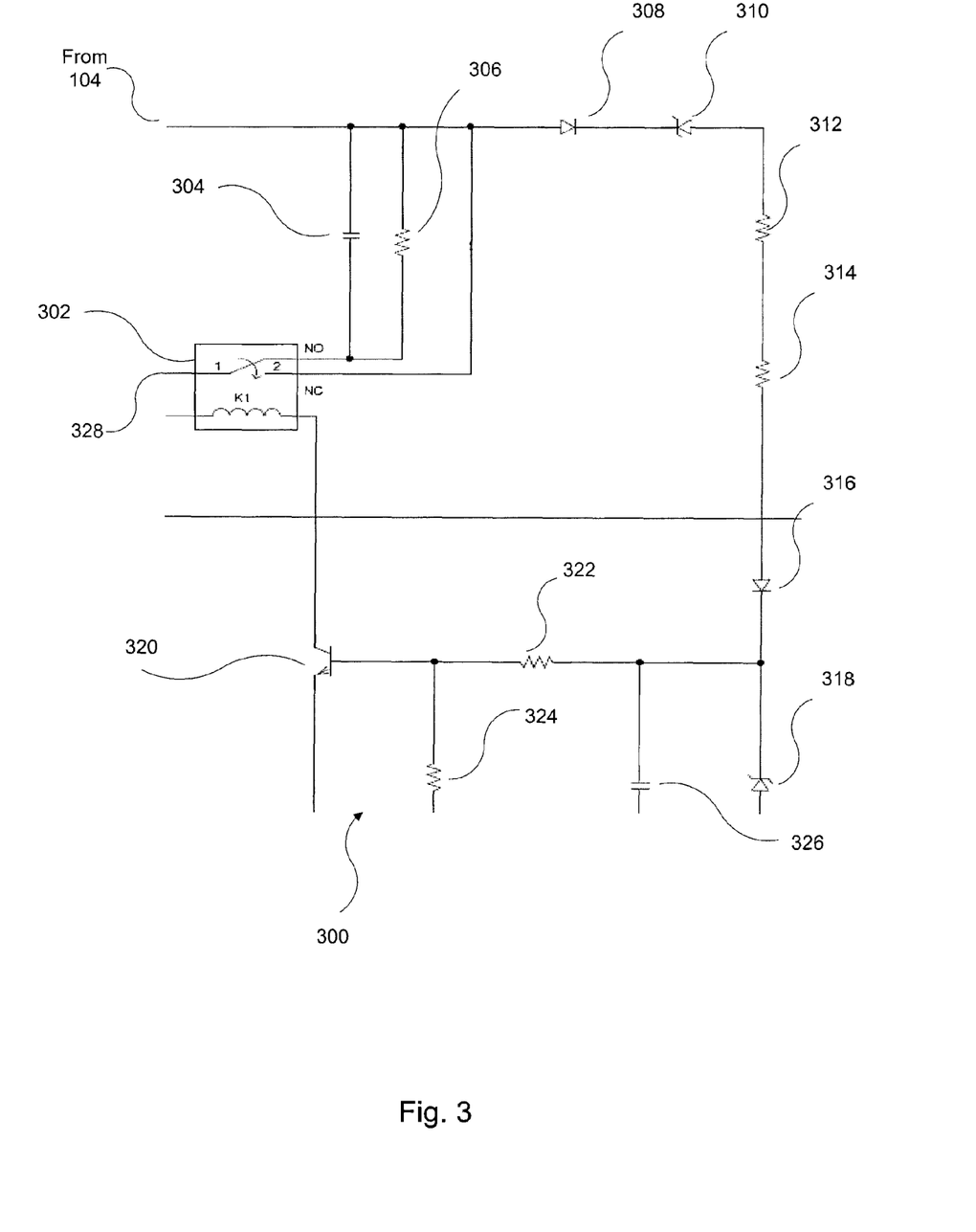
FIG. 3 is a partial view of the circuit diagram of FIG. 1, focusing on exemplary components for providing emergency power without regard to the amplitude of the input current according to one exemplary embodiment.

Returning to step 215, if the determination is negative, this indicates that the emergency ballast 100 is electrically coupled to a smaller input supply, and the NO branch is followed to step 225, wherein the battery 102 is charged. In the United States, the smaller input supply is typically 120 volts. In this instance, the method 100 skips step 220 and does not electrically couple the capacitor 304 to the circuit 300, thus providing ideal charging for the battery 102 based on the input voltage. As discussed above, one exemplary embodiment involves a smaller voltage of 120 volts and a larger voltage of 277 volts. In alternative embodiments, however, alternative voltages can be used, including, by way of example only, 120 volts and 347 volts; 347 volts and 600 volts; and 100 volts and 220 volts.

Turning now to FIG. 3, one exemplary circuit 300 for carrying out the method 200 of FIG. 2 is provided. The circuit 300 includes a relay 302 that is configured to switch a capacitor 304 into or out of the circuit, depending on the input voltage. The input 104 to the circuit 300 is provided by mains power. The output 328 of relay 302 is provided to the battery 102. In one exemplary embodiment, the relay 302 is a single-pole double-throw (SPDT) relay, although one of ordinary skill in the art would recognize that other relays or switches could also be used. When the relay 302 is in one position, capacitor 304 and resistor 306 are electrically decoupled from the circuit 300, thus increasing the stored charge that is applied to the battery 102 relative to the magnitude of the input source 104. This position is used for lower amplitude input sources, such as standard U.S. 120V mains power.

In one exemplary embodiment, the circuit 300 also includes diode 308 and Zener diode 310. In certain exemplary embodiments, the breakdown voltage of Zener diode 310 is equal to the ideal charge voltage for the battery 102. If the voltage to the Zener diode 310 exceeds the ideal charge voltage and causes the Zener diode 310 to break down, then the voltage at the input source 104 must be a higher amplitude input source, such as standard U.S. 277V mains power.

Once Zener diode 310 breaks down, charge flows across resistors 312 and 314 and diode 316. Then capacitor 326 begins to charge, which causes current to flow to the base of transistor 320, activating the transistor 320. Once activated, the transistor 320 causes current to flow across the coil of relay 302, causing the relay to switch, thus electrically coupling the capacitor 304 to the circuit 300. With capacitor 304 electrically coupled to the circuit 300, and the total capacitance falls, causing the battery 102 to continue to receive the appropriate charge voltage, despite the higher input voltage. In an alternative exemplary embodiment, rather than placing the capacitor 304 in series with the circuit, the capacitor 304 can be placed in a parallel configuration. When the capacitor 304 is in a series configuration, switching the capacitor 304 in or out of the circuit has the opposite effect—in other words, the capacitor 304 is switched into the circuit when the input source is the lower voltage, and switched out of the circuit when the input source is the higher voltage.

In one exemplary embodiment, if the input voltage falls back to the lower level, for example 120V, the process will reverse itself because the input voltage will no longer exceed the breakdown voltage of Zener diode 310. In response, transistor 320 is deactivated, which prevents current from flowing across the coil of relay 302 and causes the relay 302 to switch the capacitor 306 back out of the circuit 300. Although the exemplary circuit 300 is described in terms of capacitors, relays, and transistors, one of skill in the art would understand that the electrical characteristics of these exemplary components, either alone or in combination, can be replicated using other discrete components or integrated circuits.

Figure 4:
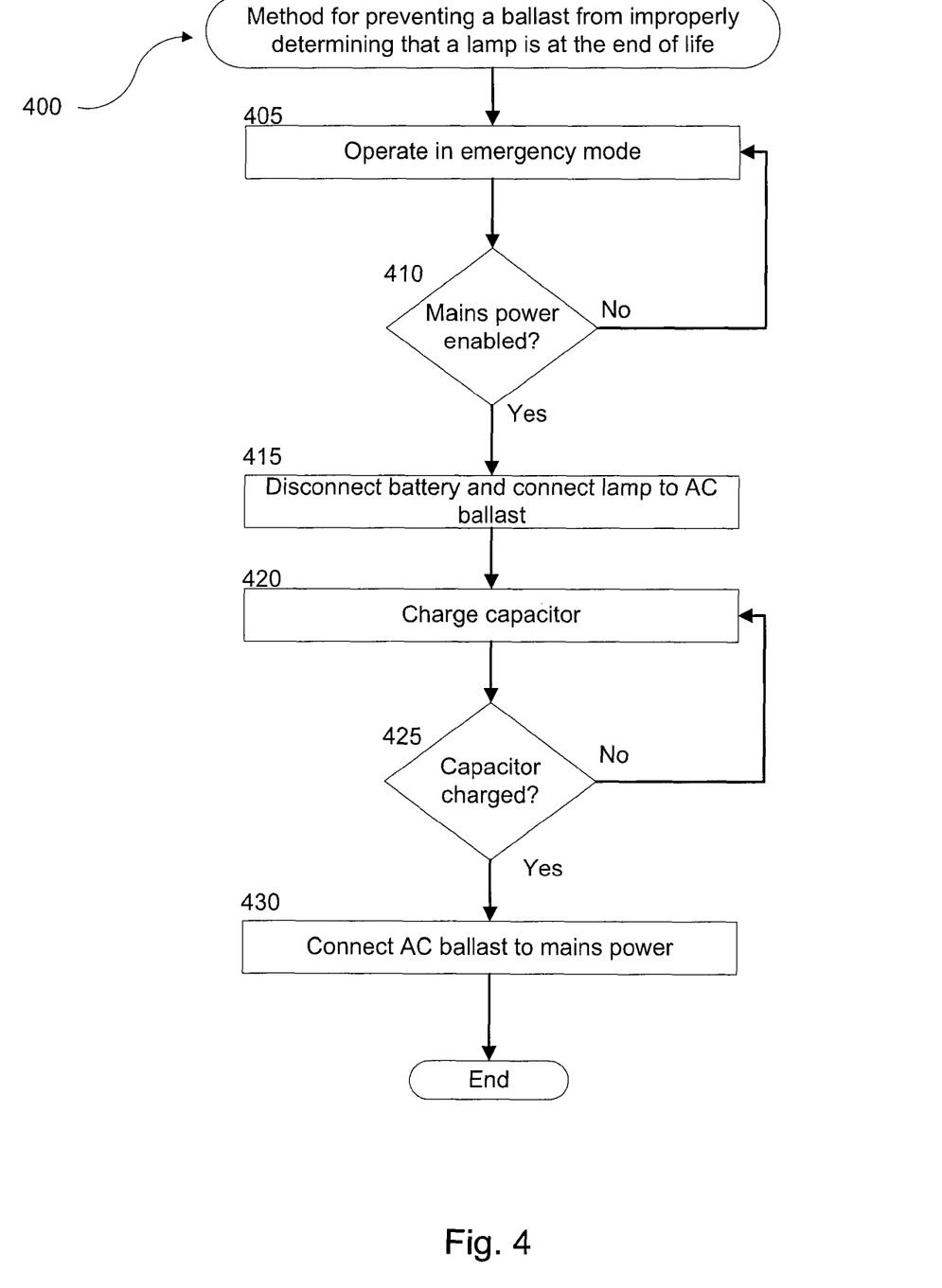
FIG. 4 is a flow chart describing an exemplary method for preventing fluorescent ballasts from improperly determining that a lamp is at the end of life according to one exemplary embodiment.

Turning now to FIG. 4, one exemplary method 400 is provided for preventing a ballast from improperly determining that a lamp is at the end of life. Referencing now to FIGS. 1, 4, and 5 the exemplary method 400 begins at step 405, where the ballast 100 operates in emergency mode, meaning that an interruption in power has been detected, and the ballast 100 is powering a lamp using power from the battery 102. In step 410, an inquiry is made to determine whether mains power has been restored. In one exemplary embodiment, this determination is made by the relay 512 which transitions state from normally closed (no charge current) to normally open (with charge current). If the determination in step 410 is negative, the method 400 follows the NO branch to step 405 and the ballast 100 continues to operate in emergency mode. If, on the other hand, it is determined that mains power is enabled, the YES branch is followed to step 415, wherein the ballast 100 continues to operate the lamp using the battery 102. The method then proceeds to step 420, wherein a capacitor 504 is charged. In step 425, if capacitor 504 is not fully charged, the method follows the NO branch to step 420. If, on the other hand, the capacitor 504 is fully charged, the YES branch is followed to step 430, wherein lamp operation is switched back to mains power. The method 400 then ends.

Figure 5:
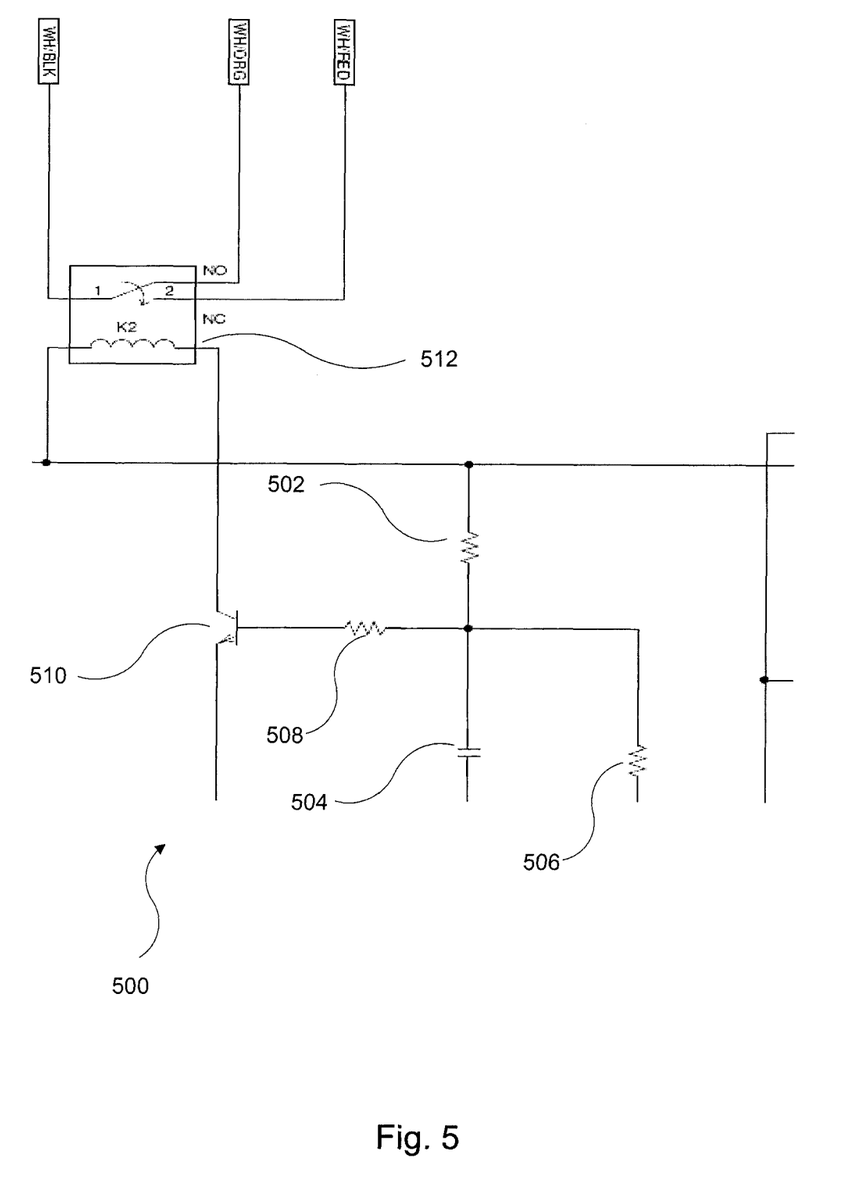
FIG. 5 is a circuit diagram setting forth an exemplary circuit for preventing fluorescent ballasts from improperly determining that a lamp is at the end of life according to one exemplary embodiment.

Turning now to FIG. 5, an exemplary circuit 500 is provided for carrying out the method 400 as shown in FIG. 4. Referring now to FIGS. 1 and 5, the circuit 500 includes a relay 512. In an exemplary embodiment, the relay 512 is a SPDT relay. When current is not passing through the coil of the relay 512, the emergency ballast 100 will supply power from the battery 102 to the lamp. When current is passing through the coil of the relay 512, the emergency ballast 100 will switch the standard ballast in to power the lamp.

When mains power is restored, rather than immediately providing power from the mains to the lamp, the relay 512 remains in the same state. Mains power begins to charge capacitor 504. Once capacitor 504 is sufficiently charged, as one of skill in the art would understand, current begins to flow through the capacitor 504 and to the base of transistor 510, which in turn places transistor 510 in the active (conductive) state. Once transistor 510 becomes conductive, current flows through relay 512 causing the relay to switch such that it provides power to the ac ballast and the battery 102 no longer powers the lamp. The delay in the switching action caused by the capacitor 504 charging allows relays throughout the system, including in the AC ballast (not shown), to settle to a steady state before switching on power to the AC ballast with relay 512 By ensuring that the relays have settled, the AC ballast (not shown) will not improperly register an open circuit and therefore incorrectly determine that the lamp has reached the end of its life. An additional advantage of the circuit 500 is that it electrically isolates the relay 512 contacts to mains power, which allows the fluorescent ballast to be operated on one main, while the emergency ballast 100 is operated with another. Further, because the relay 512 is isolated from the rest of the circuit 100, the circuit 500 can switch either the neutral line input or the hot line input to the standard fluorescent ballast without risk of damage to the rest of the circuit.

Figure 6:
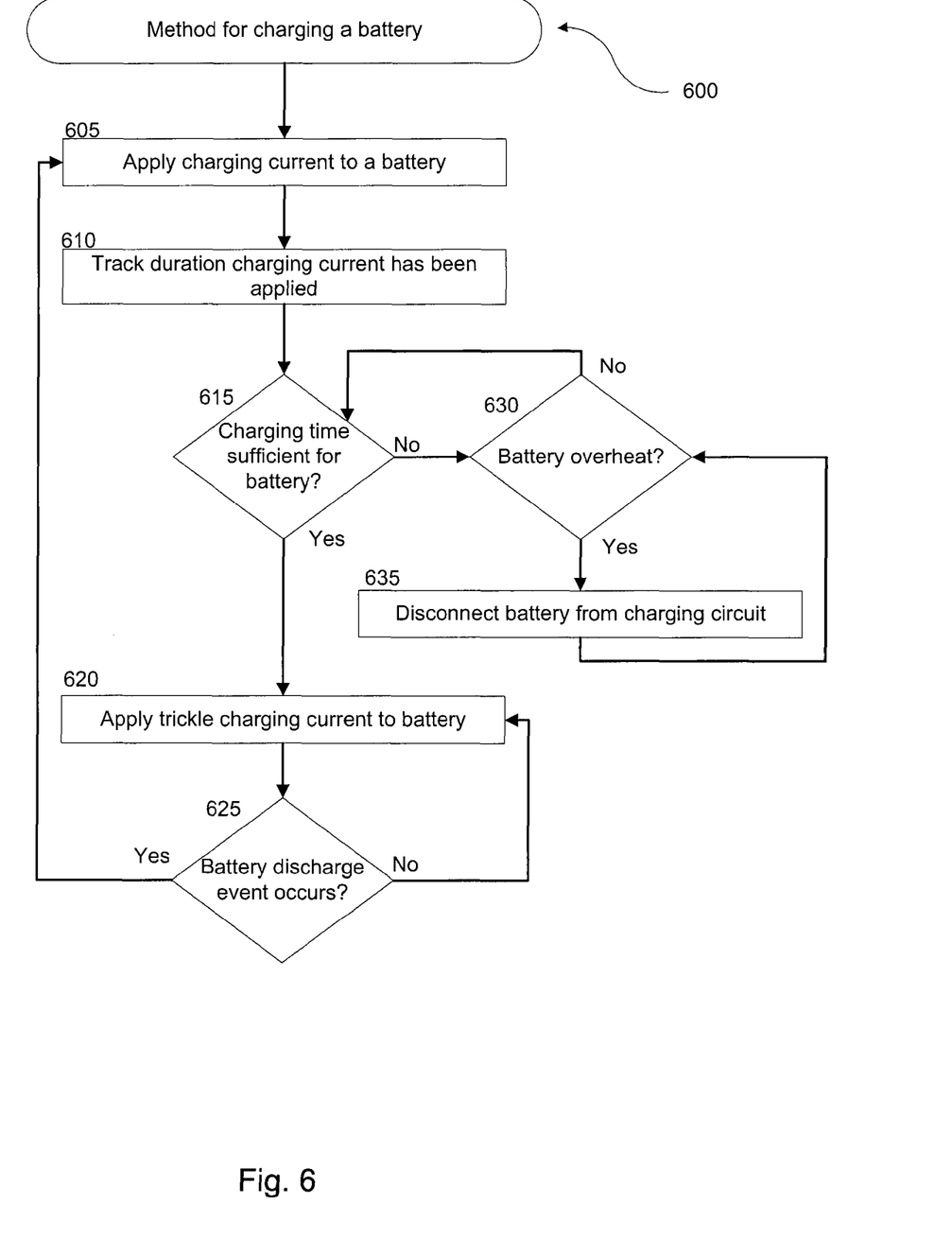
FIG. 6 is a flow chart describing an exemplary method for employing rechargeable batteries in an emergency fluorescent ballast according to one exemplary embodiment.

Turning now to FIG. 6, an exemplary method 600 for charging a battery is provided. In exemplary embodiments, the method 600 is a modification to the emergency ballast 100 of FIG. 1 and provides an improved charging method that is used with certain battery technologies, such as nickel metal hydride, that cannot simply be charged by applying a constant charging current. Now, referring to FIGS. 1, 6, 7, 8, and 9, in step 605 a charging current is applied to a battery 102. The magnitude of the charging current is typically dictated by the battery manufacturer, and is conventionally specified in terms of a fraction of a battery's capacity. By way of example only, the current needed to "slow charge" a battery—to charge the battery over the course of 24 to 48 hours, is typically $\frac{1}{16}$ of capacity and $\frac{1}{32}$ of capacity respectively. To fast charge a battery, the current is typically $\frac{1}{6}$ of capacity. In step 610, the method 600 tracks the duration over which the charging current is applied to the battery 102. In one exemplary embodiment, the duration is tracked by a countdown timer 814. In step 615 it is determined whether the charging time is sufficient for the battery. In one exemplary embodiment, 24 hours is a sufficient time to charge the battery 102 using "slow charging," although as one of skill in the art would understand, the sufficient time to charge can vary from battery to battery. If the decision in step 615 is negative, the method follows the NO branch is followed to step 630. In step 630, it is determined whether the battery is overheating. In one exemplary embodiment, this determination is made by thermally coupling a thermistor 904 to the battery 102 whose resistance changes as the battery changes in temperature. When the resistance changes by a predetermined amount, it is concluded that the battery 102 has overheated. If the decision in step 630 is affirmative, the method 600 follows the YES branch to step 635, wherein the battery is decoupled from the charging circuit. The method then returns to step 630, wherein it is again determined whether the battery is overheated. Once it is determined that the battery is not overheated, the battery is reconnected to the charging circuit if necessary, and the method returns to step 615.

If, on the other hand, the decision in step 615 is affirmative, the YES branch is followed to step 620, where a trickle charge is applied to the battery 102. A trickle charge maintains the charge of a full battery without applying a full charging current. For certain battery technologies, such as NiMH technology, application of a full charging current to an already charged battery over a long period of time can cause the battery to fail.

After applying the trickle charge to the battery 102, the method proceeds to decision step 625, wherein it is determined whether a battery discharge event occurred. In an exemplary embodiment, a battery discharge is triggered upon a loss of mains power. In an exemplary embodiment, a battery discharge event occurs when a power interruption or test procedure causes the emergency ballast 100 to power the lamp using the battery 102. If a battery discharge event has occurred, the YES branch is followed to step 605. On the other hand, if a battery discharge event did not occur, the NO branch is followed back to step 620 and continues the battery 102 continues to receive a trickle charge.

Figure 7:
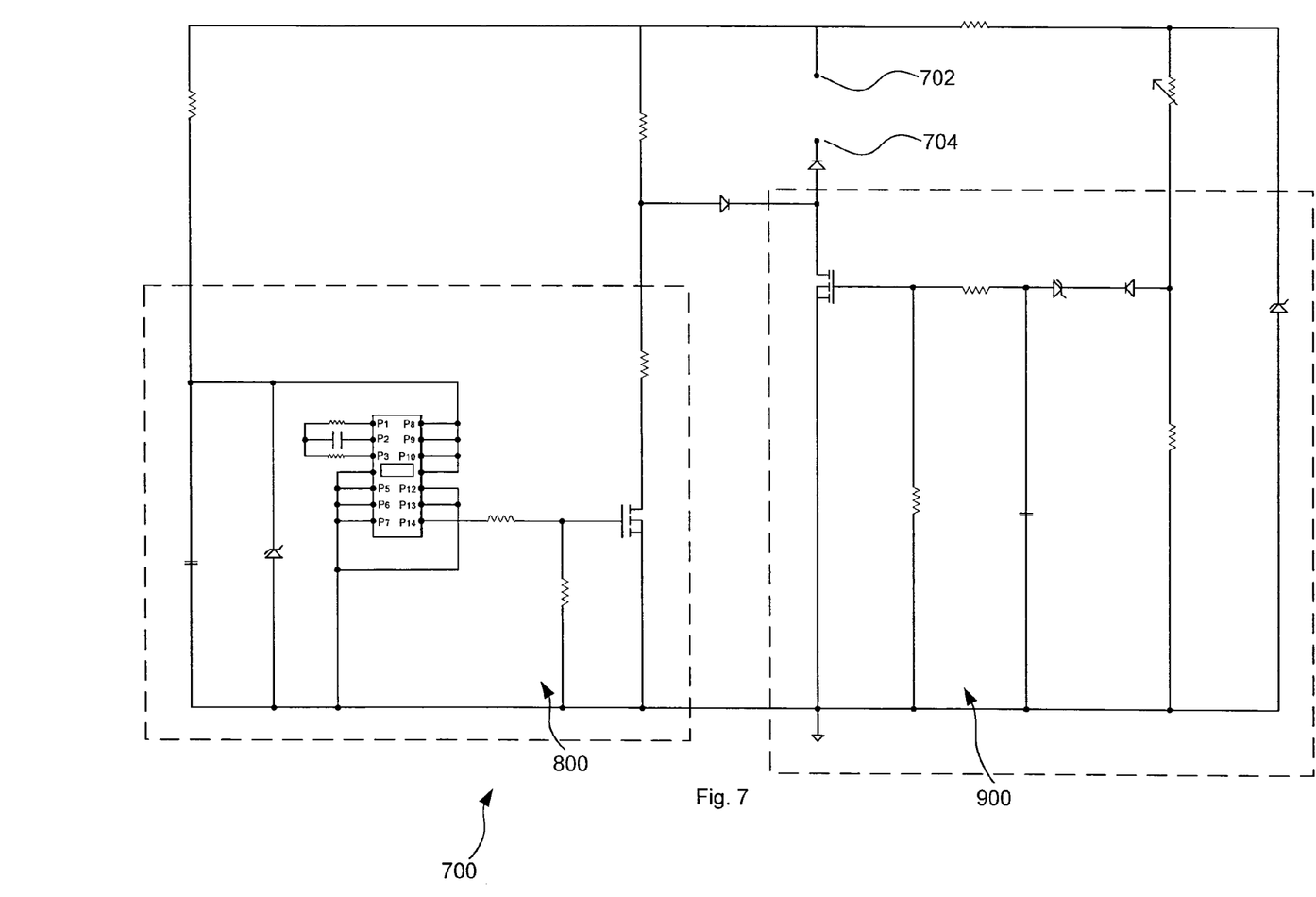
FIG. 7 is a circuit diagram setting forth a circuit for employing rechargeable batteries in an emergency fluorescent ballast according to one exemplary embodiment.

Turning now to FIG. 7, an exemplary circuit 700 for charging a battery according to one exemplary embodiment is described. In one exemplary embodiment, the circuit 700 an optional modification of the emergency ballast 100 of FIG. 1. Alternatively, the circuit 700 is capable of being incorporated into any circuit that is used in conjunction with a rechargeable battery. In one exemplary embodiment, the circuit 700 is electrically coupled to connection point 702 and receives input current that is equivalent to the charge current for slow charging the battery 102 therefrom. The output of the circuit 700 is electrically coupled to connection point 704, and provides current to the battery 102 therethrough. The circuit 700 also includes a trickle charge circuit 800 that determines when to output a trickle charge to the battery and when to output a charging current. The circuit 700 also includes a thermal protection circuit 900 terminates charging of the battery 102 in the event the battery 102 overheats. Circuits 800 and 900 will be discussed in further detail with respect to FIGS. 8 and 9, below.

Figure 8:
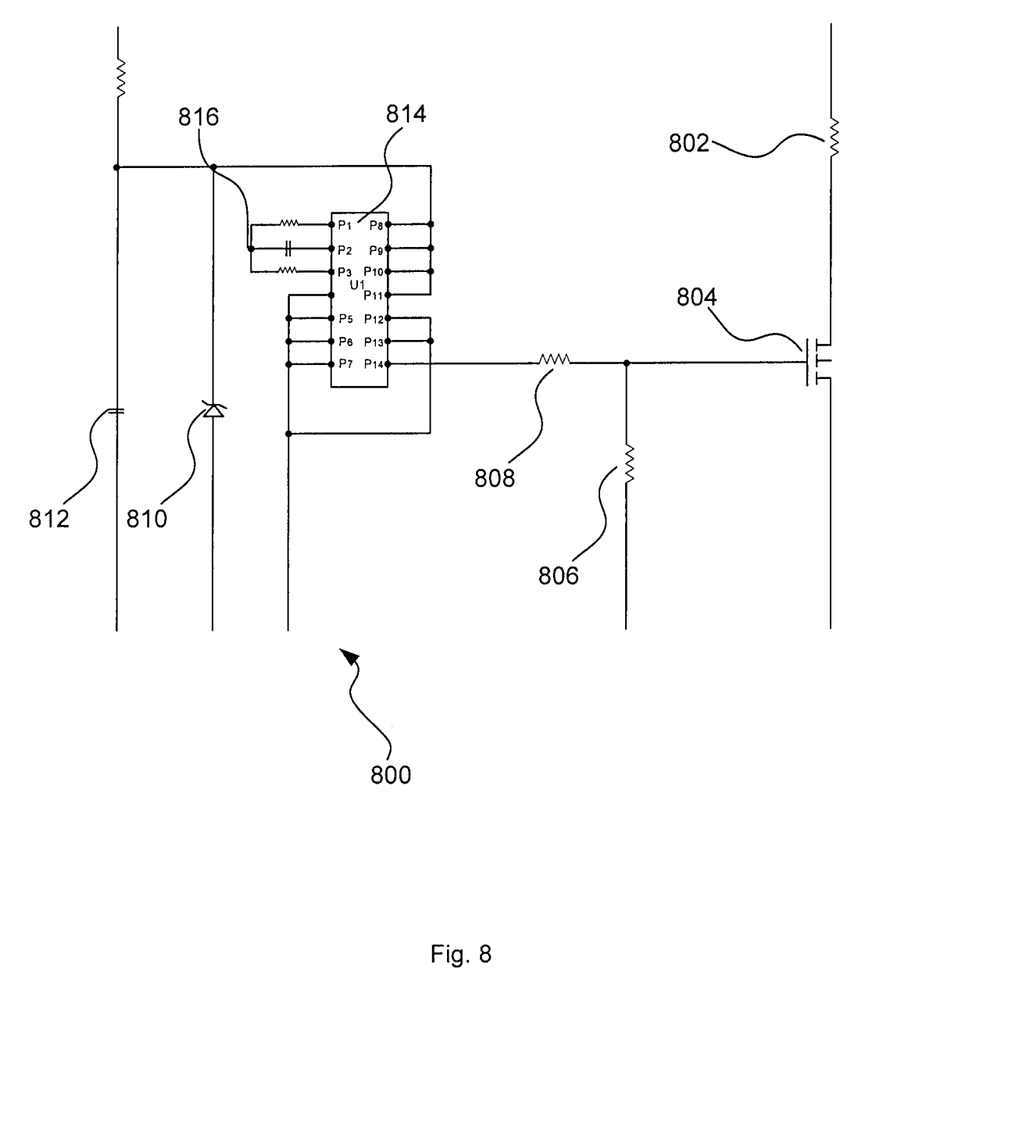
FIG. 8 is a partial view of the circuit diagram of FIG. 7 setting forth a circuit for employing rechargeable batteries in an emergency fluorescent ballast according to one exemplary embodiment.

Turning now to FIG. 8, one exemplary circuit 800 for determining when to trickle charge a battery 102 and when to apply a charging current according to an exemplary embodiment is shown and described. Referring now to FIGS. 1, 7, 8, and 9, in one exemplary embodiment, the circuit 800 includes a timer 814. The exemplary timer 814 is a countdown timer, such as the Fairchild C0454 integrated circuit. Alternatively, the timer 814 is any circuit capable of tracking time. The exemplary circuit 800 includes a Zener diode 810 and a capacitor 812 that receive current from the input 702 and provide power to the timer 814. The exemplary circuit 800 also includes RC circuit 816 that the timer 814 uses to determine the appropriate period for timing. The properties of the RC circuit 816 are conventionally in the data sheet for the timer 814. In the exemplary embodiment, the appropriate period for timing is 24 hours, although the time can vary depending on specific charging requirements associated with the battery 102. While the timer 814 is counting down, the transistor 804 is off, which electrically decouples the resistor 802 from the circuit 800. Accordingly, the entire voltage from the input 702 is passed to the output 704.

When the timer 814 completes its countdown, or otherwise determines that an appropriate period of time has passed, in one exemplary embodiment, the timer 814 outputs a signal that turns on the transistor 804. When the transistor 804 is on, the resistor 802 becomes part of the circuit 800, dividing the voltage received from the input 702 so as to place a voltage consistent with a trickle charge on the output 704.

Figure 9:
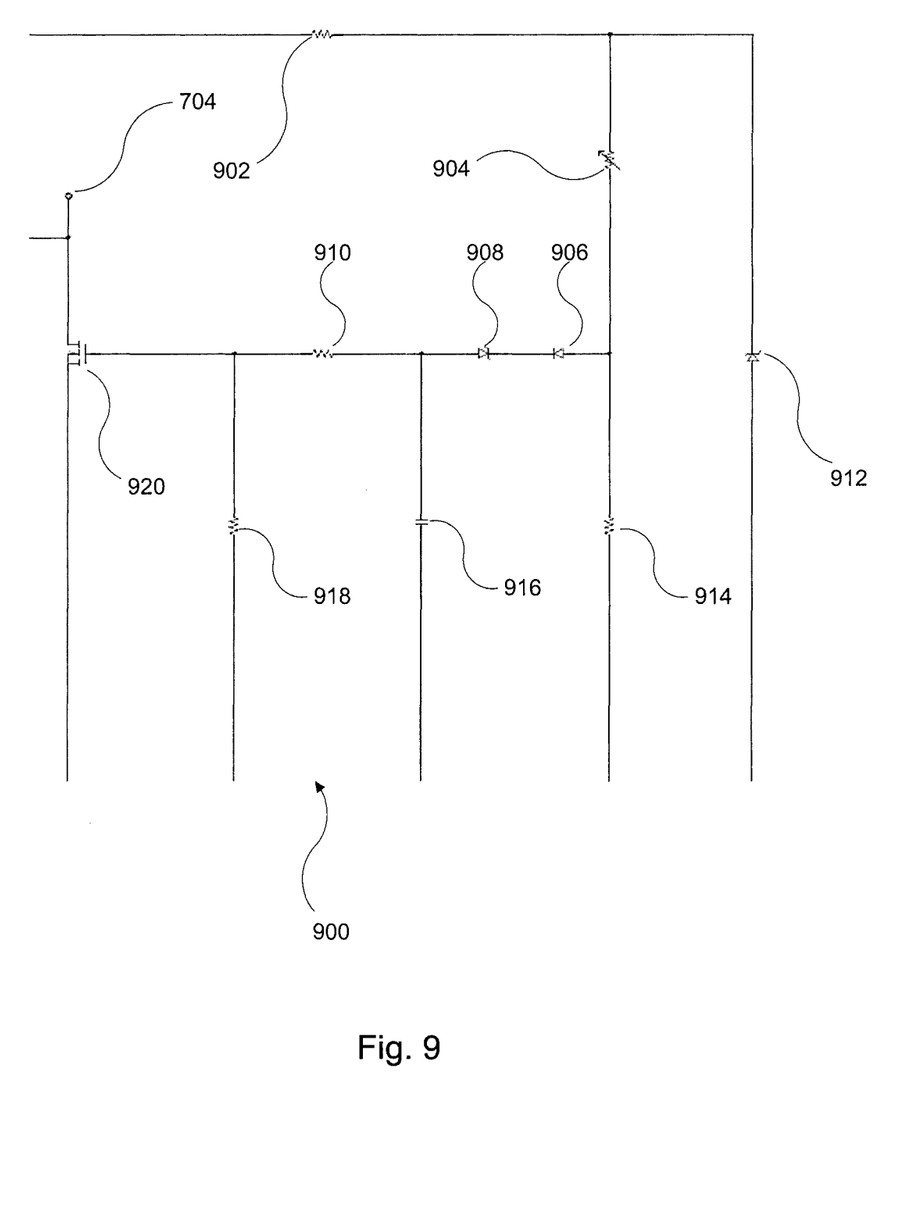
FIG. 9 is a partial view of the circuit diagram of FIG. 7 setting forth a thermal protection circuit for rechargeable batteries in an emergency fluorescent ballast according to one exemplary embodiment.

Turning to FIG. 9, an exemplary thermal protection circuit 900 is shown and described. In one exemplary embodiment, the thermal protection circuit 900 monitors the temperature of the battery 102 and prevents charging when the temperature exceeds a preset limit. Referring now to FIGS. 1, 7, 8, and 9, the circuit 900 includes a thermistor 904 that is thermally coupled to the battery 102. The thermistor 904 is coupled in series with a resistor 914, both of which are in parallel with a Zener diode 912 that has a breakdown voltage beneath the battery voltage.

In one exemplary embodiment, the thermistor 904 has a high resistance at room temperature. The resistance of the thermistor 904 falls as the temperature of the battery 102 increases. Because the voltage across resistor 914 is calculated as a voltage divider with the thermistor 904, as the resistance of the thermistor 904 falls, the voltage across resistor 914 increases. When the voltage across resistor 914 exceeds the breakdown voltage of the Zener diode 908, the Zener diode 908 becomes conductive and begins charging the capacitor 916. When the capacitor 916 is sufficiently charged, current begins to flow to the base of the transistor 920, causing it to become conductive. When the transistor 920 becomes conductive, the output to the battery 102 is pulled to ground, preventing charging and allowing the battery 102 to cool. Once the battery 102 is sufficiently cool, the process reverses itself and charging resumes.

Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the invention. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. An emergency ballast for a light source, comprising:
    a rechargeable battery;
    a first circuit, wherein the first circuit receives an electrical voltage and provides a first charge to the battery, wherein the electrical voltage comprises one of a first amplitude and a second amplitude, and the first circuit provides the first charge to the battery without regard to whether the electrical voltage comprises the first amplitude and the second amplitude;
    a standard mode, wherein a fluorescent lamp is powered using mains power;
    an emergency mode, wherein the fluorescent lamp is powered using the battery, wherein the emergency ballast switches from standard mode to emergency mode in response to an interruption in mains power, and switches from emergency mode to standard mode in response to the resumption of mains power; and
    a transition circuit configured to delay the transition between the standard mode and the emergency mode, wherein the transition circuit comprises:
        a relay, wherein the relay switches the emergency ballast from emergency mode to standard mode;
        a transistor, electrically coupled to the relay, wherein the transistor prevents the relay from switching when the transistor is not conductive; and
        a capacitor, electrically coupled to mains power and the transistor, the capacitor configured to charge from mains power, wherein after charging the capacitor, current is delivered to the transistor rendering the transistor conductive and causing the relay to switch the emergency ballast into standard mode.

2. The emergency ballast of claim 1, wherein the first charge comprises a charging current for the battery.

3. The emergency ballast of claim 1, wherein the first amplitude is one of 100 volts, 120 volts, 347 volts.

4. The emergency ballast of claim 3, wherein the second amplitude is one of 220 volts, 277 volts, 347 volts, and 600 volts.

5. The emergency ballast of claim 1, further comprising:
    a capacitor, electrically coupled to the first circuit, wherein the capacitor provides additional voltage to the rechargeable battery when the electrical voltage comprises the first amplitude; and
    a switch that electrically decouples the capacitor from the first circuit when the electrical voltage comprises the second amplitude.

6. The emergency ballast of claim 1, further comprising:
    a capacitor, electrically coupled to the first circuit, wherein the capacitor provides additional voltage to the rechargeable battery when the electrical voltage comprises the first amplitude; and
    a switch that electrically couples the capacitor to the first circuit when the electrical voltage comprises the second amplitude.

7. The emergency ballast of claim 1, further comprising a charging circuit electrically coupled to the battery and applies a trickle charge to the battery.

8. The emergency ballast of claim 1, wherein the charging circuit applies a charging current to the battery for a first period of time, and applies a trickle charge to the battery after the first period of time.

9. The emergency ballast of claim 8, wherein the charging circuit further comprises a thermal protection circuit, the thermal protection circuit comprising a switch that electrically decouples the charging circuit from the battery when the battery exceeds a predetermined temperature.

10. The emergency ballast of claim 9, wherein the switch comprises a transistor; and
the thermal protection circuit further comprises:
a thermistor thermally coupled to the battery;
a resistor electrically coupled to the thermistor, wherein the resistor and the thermistor create a voltage divider, and
wherein when the voltage across the resistor exceeds a predetermined level, current is delivered to the transistor, causing the transistor to electrically decouple the battery from the charging circuit.

11. An emergency fluorescent ballast, comprising:
a battery;
a charging circuit for charging the battery, the charging circuit comprising:
an input that receives a charging current from the ballast; and
a timing circuit configured to deliver the charging current to the battery for a predetermined time, the timing circuit further delivering a trickle charging current to the battery after the predetermined time;
a standard mode, wherein a fluorescent lamp is powered using mains power;
an emergency mode, wherein the fluorescent lamp is powered using the battery, wherein the emergency ballast switches from standard mode to emergency mode in response to an interruption in mains power, and switches from emergency mode to standard mode in response to the resumption of mains power; and
a transition circuit that delays the transition between the standard mode and the emergency mode, the transition circuit comprising:
a relay that switches the emergency ballast from emergency mode and standard mode;
a transistor, coupled to the relay, wherein the transistor prevents the relay from switching when the transistor is not conductive; and
a capacitor, coupled to mains power and the transistor, the capacitor receiving a charge from mains power, and wherein in response to the charging of the capacitor, current is delivered to the transistor such that the transistor becomes conductive and causes the relay to switch the emergency ballast into standard mode.

12. The emergency fluorescent ballast of claim 11, wherein the charging circuit further comprises a thermal protection circuit that prevents application of the charge to the battery when the battery exceeds a predetermined temperature.

13. The emergency fluorescent ballast of claim 12, wherein the thermal protection circuit comprises:
a thermistor thermally coupled to the battery;
a resistor electrically coupled to the thermistor, wherein the resistor and the thermistor create a voltage divider, and
wherein when the voltage across the resistor exceeds a predetermined level, current is delivered to a transistor electrically coupled to the battery, causing the transistor to electrically decouple the battery from the charging circuit.

14. The emergency fluorescent ballast of claim 11, wherein the charging current comprises a charging current for the battery, and wherein the trickle charging current comprises a current calculated to keep the battery at a substantially full charge.

15. The emergency fluorescent ballast of claim 11, wherein the battery comprises one of a nickel metal hydride battery, copper oxide battery, iron oxide battery, lithium ion battery, and an iron chloride battery.

16. The emergency fluorescent ballast of claim 11, further comprising a circuit receiving an electrical voltage and providing the charging current to the battery, wherein the electrical voltage comprises one of a first amplitude and a second amplitude, and the circuit provides the charging current to the battery without regard to whether the electrical voltage comprises the first amplitude and the second amplitude.

17. The emergency fluorescent ballast of claim 16, wherein the first amplitude is 120 volts, and the second amplitude is 277 volts.

18. A method for providing emergency power to a light source, the method comprising:
receiving a current from mains power;
converting the current from mains power to a charging current for a battery;
providing the charging current to the battery for a predetermined time;
providing a trickle charge after the predetermined time has elapsed;
monitoring the temperature of the battery to determine whether the temperature of the battery has exceeded a predetermined temperature;
preventing the application of current to the battery in response to determining that the battery has exceeded the predetermined temperature;
determining if mains power exceeds a predetermined amplitude; and
charging a capacitor to provide additional charge in response to determining that mains power does not exceed the predetermined amplitude.

19. The method of claim 18, further comprising electrically decoupling the capacitor in response to determining that mains power exceeds the predetermined amplitude.

20. The method of claim 18, further comprising;
operating the fluorescent lamp using power from the battery;
preventing the ballast from powering the lamp with the mains power for a second predetermined time; and
powering the lamp with the ballast using the mains power after the second predetermined time.

* * * * *